Patented Dec. 18, 1923.

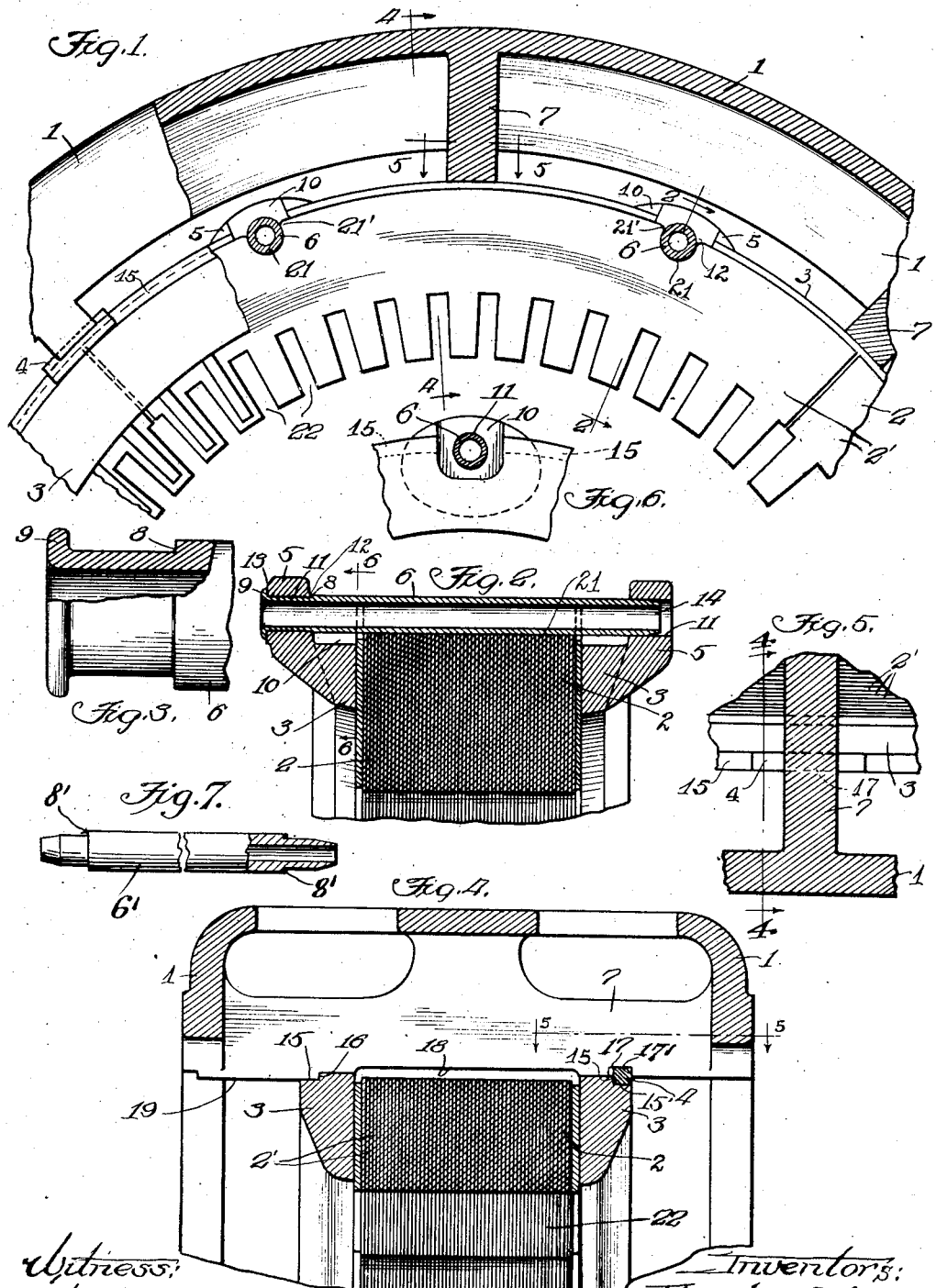

1,477,773

UNITED STATES PATENT OFFICE.

THEODOR SCHOU AND RICHARD L. BEHRENS, OF MANSFIELD, OHIO, ASSIGNORS TO THE IDEAL ELECTRIC & MANUFACTURING CO., OF MANSFIELD, OHIO, A CORPORATION OF OHIO.

DYNAMO-ELECTRIC STATOR.

Application filed July 14, 1920, Serial No. 396,082. Renewed May 10, 1923.

*To all whom it may concern:*

Be it known that we, THEODOR SCHOU, a subject of the King of Norway, and RICHARD L. BEHRENS, a citizen of the United States of America, and residents of Mansfield, county of Richland, and State of Ohio, have invented certain new and useful Improvements in Dynamo-Electric Stators, of which the following is a specification.

This invention relates to structural and magnetic features of dynamo-electric machines, and especially to the stators of machines having the box type of frame.

The main objects of the invention are to provide an improved form of stator structure; to provide improved methods and means for assembling the core and retainer rings and for securing same in place in a box frame; to provide improved means for maintaining a low temperature, including a better construction for the magnetic circuit and improved ventilation; and to provide improved and more convenient assembling and knock-down features.

An illustrative embodiment of this invention is shown in the accompanying drawings, in which—

Fig. 1 is an end view of a section of the stator frame and core, with the retaining ring and front part of the frame broken away at the right.

Fig. 2 is a radial section through one side of the stator core at 2—2 on Fig. 1, and shows one of the hollow steel retainer pins.

Fig. 3 is an enlarged side view, partly in section, of the rivet end of a retainer pin, as it appears when assembled.

Fig. 4 is a radial section at 4—4 on Figs. 1 and 5.

Fig. 5 is a fragmentary section at 5—5 on Figs. 1 and 4, and shows the method of securing the retainer ring in place by tapered key wedges.

Fig. 6 represents an inner face view of a segment of one of the retainer rings, showing a recessed and perforated lug with a retainer pin therein, as viewed on the line 6—6 of Fig. 2.

Fig. 7 shows a modified form of pin.

In the usual practice employed for holding the laminated core together and in place in such devices, the desired structural result is achieved by either stacking the stator laminations on dovetail keys which are riveted to certain cross ribs in the stator frame, or by stacking in dovetail grooves in certain cross ribs, or by using bolts which go through punched holes in the armature segments, and which are fastened either to the frame or to end brackets, as understood in the art, but this fails to produce the best results electrically or mechanically.

In the construction shown in the drawings, the stator, in this instance an armature, comprises mainly a box type of frame in the form of an open ventilated casting 1, a laminated core 2 concentric therewith and supported therein by a pair of retainer rings 3 on hollow retainer pins, and tapered keys or locking wedges 4 for securing the core rigidly in said frame.

The said rings 3 are substantially alike excepting a certain minor detail as hereinafter explained. Each is provided with an outer peripheral series of lugs 5 extending outward in a radial direction to receive the ends of a set of hollow steel retainer pins or tubes 6 adapted to support and hold the laminations together and in place between the said rings.

The said frame 1 includes a circumferential series of transverse, inwardly disposed ribs or web members 7 whereby the rings 3 and the core carried thereby, are supported the coacting lugs 5 and pins 6 are disposed alternately with respect to said ribs and are preferably positioned midway between the ribs.

As shown by the accompanying drawings, each pin 6 is permanently secured at one end to the corresponding lug. For this purpose the tube is provided with an outwardly facing annular shoulder 8 arranged to abut against the corresponding inner face of lug 5. The outer tip of the tube is expanded or riveted tightly against the outer face of the lug, as shown at 9. The opposite tip is beveled. The main body of each ring is recessed on its upper side as at 10 in alinement with and about the hole 11 for the pin 6. In order to provide a smooth and secure bearing for the shoulder 8 and tip 9, the corresponding ring lugs have bosses 12 and 13 which are spot faced, as will be understood. The lugs of the opposite ring may be of plain construction with the bosses omitted, for they each merely receive the free end of pin 6 which need only extend part way through the lug as shown at 14.

Each of the rings is provided with a shoulder forming groove 15 at its outermost edge. The groove of one of these rings receives a corresponding shoulder 16 of the rib 7, and the groove of the opposite ring receives the wedge 4 whereby the parts may be held in tight fitting and rigid relation to one another. In order to accommodate said wedge, the rib 7 is provided with a notch 17. The wedge reacts against the edge 17' of this notch, which is longitudinally remote from the core and the radial face 15' of the ring groove 15. The inner edge of each rib 7 is substantially straight and parallel with the main axis of the device, except for notch 17 and except that a wide recess or notch 18 is provided opposite the core 2 for ventilation, and the inwardly disposed shoulder forming part 19 projects somewhat toward the rotor. This form of structure largely eliminates machine work.

The lugs 5 extend in an axial direction beyond the retainer ring proper so as not to interfere with the machining of the outside cylindrical face of the ring, which forms the seat for holding the retainer rings in place radially against the ribs 7, and also not to interfere with the machining of the continuous radial groove 15 at its outermost edge.

The pins 6 are disposed in partially open slots 21, which have overhanging sides or lips 21', which partly embrace the pins and so hold the lamination segments 2' securely in place.

Ventilation is amply provided for in the use of hollow air-cooled pins and the air spaces at 10 and 18. Moreover, heat generation is reduced to a minimum by reason of the slots 21 being shallow and the pin 6 being not only hollow, thus reducing eddy current losses, but also largely out of the magnetic path.

In order to assemble the device, a set of pins 6 are secured to one of the retainer rings 3, as shown at the left-hand side of Fig. 2. The core is then built up of circular segments, which are "stacked" on said pins and ring. This ring with the pins 6 set therein is then laid in the frame against shoulders 16 with the pins standing erectly. After the core has been stacked to the required number of layers, the other retainer ring 3 is placed over the projecting pins so that the pins enter the reamed holes in the lugs 5. Pressure is then applied to the ring which compresses the core. After the core has been compressed to the desired amount, the tapered key wedges 4 are driven in place between the circular groove face 15' in the retainer ring and the face 17' of notch 17 in the rib 7.

To take the device apart, the reverse operation is followed. The stator windings are disposed in the slots 22, as will be understood. In this instance a rotary field, not shown, is mounted in the space within the core 2.

As an alternative construction, each core holding pin 6' may be held radially at each end in a reamed hole in the corresponding lugs of the retainer rings. With this construction a shoulder 8' is provided near each end of the retainer pins, which locates the pins between the retainer rings laterally. Both ends are slightly beveled at each end to facilitate the assembling of the retainer rings and core. Pins 6 and 6' may be arranged alternately.

Although but one specific embodiment of this invention is herein fully shown and described, together with a modified detail, it is to be understood that numerous details of the constructions shown may be altered or omitted without departing from the spirit of the invention as defined by the following claims.

We claim:

1. In a dynamo-electric machine, a stator comprising a box type of frame, a laminated core held thereby, a pair of retainer rings for supporting the laminations, and wedging means for locking said parts together, said frame including a series of transverse inwardly disposed ribs to support the core and rings, each rib being provided near one end with a stop shoulder to hold one ring and the core in a definite location, and a cross groove for said wedging means near the other end to secure the core and retaining rings as one unit, said rings having radially outstanding lugs disposed between the said ribs, and a series of core registering pins disposed in slots in said core in non-tension condition and having their ends supported in said lugs, which serve merely to secure said pins against radial movement.

2. In a device of the character described, a laminated ring-like core, in combination with a pair of retainer rings clamped thereto on opposite sides, and a series of pins distributed about the outer part of said core, for supporting the laminations in place, said pins having their ends set in said rings which are correspondingly apertured to receive them, and one end of alternate pins having an outwardly facing shoulder to receive the inner face of the corresponding ring and the adjacent outer end of the pin being riveted permanently against the outer face of said ring, and the rest of the pins each having an outwardly facing shoulder near each end to locate the pins laterally between the retainer rings with each end free to float laterally in the apertures which receive them.

3. In a device of the character described, a laminated annular core, in combination with a pair of retainer rings disposed against its sides respectively, and a series of pins distributed about the outer part of said core to support the laminations, said pins having their ends seated in said rings, which are apertured to receive them, and alternate pins being shouldered at one end and each end respectively.

Signed at Mansfield, Ohio this 3rd day of July, 1920.

THEODOR SCHOU.
RICHARD L. BEHRENS.